H. R. STUART.
REGULATING CONTROLLER FOR ELECTRIC MOTORS.
APPLICATION FILED JULY 17, 1912.
1,231,666.
Patented July 3, 1917.
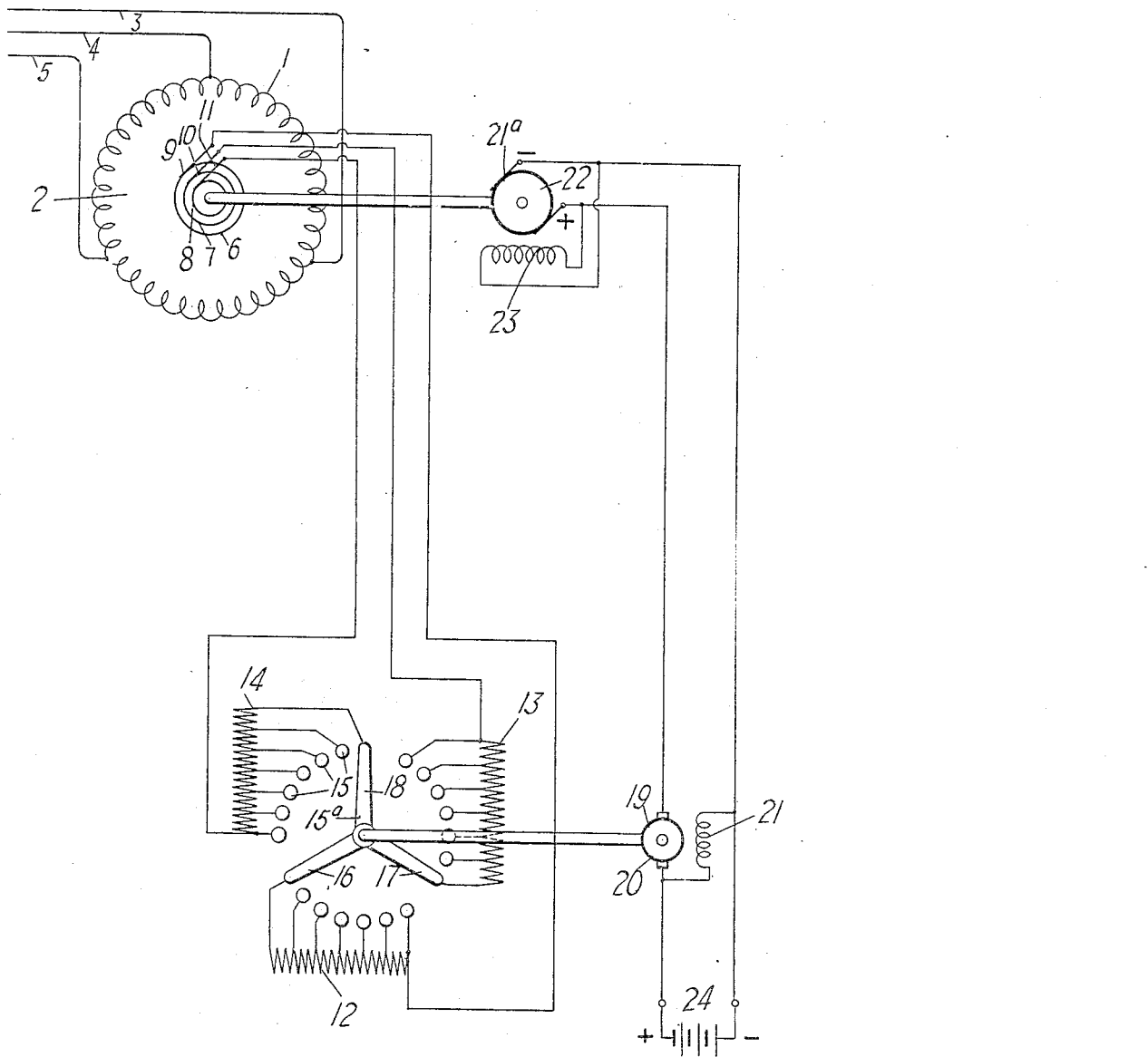

UNITED STATES PATENT OFFICE.

HARVE R. STUART, OF SPRINGFIELD, OHIO, ASSIGNOR TO WESTINGHOUSE ELECTRIC AND MANUFACTURING COMPANY, A CORPORATION OF PENNSYLVANIA.

REGULATING-CONTROLLER FOR ELECTRIC MOTORS.

1,231,666.　　Specification of Letters Patent.　　Patented July 3, 1917.

Application filed July 17, 1912.　Serial No. 710,032.

*To all whom it may concern:*

Be it known that I, HARVE R. STUART, a citizen of the United States, and a resident of Springfield, in the county of Clark and State of Ohio, have invented a new and useful Improvement in Regulating-Controllers for Electric Motors, of which the following is a specification.

My invention relates to the regulation and control of electric motors and it has special reference to such systems as embody automatic means for governing the secondary resistances of polyphase induction motors.

The object of my invention is to provide simple and automatic means, that shall respond promptly to small variations in the load and in the speed of a polyphase induction motor, and so adjust its secondary resistance, as to hold the motor at a substantially constant speed under varying loads.

The single figure of the accompanying drawings is a diagrammatic view of a system of regulation and distribution embodying my invention.

Referring to the drawing, the primary winding 1 of an induction motor 2 is supplied with energy from any suitable polyphase source, through conductors 3, 4 and 5.

The motor secondary is provided with collector rings 6, 7 and 8 and coöperating brushes 9, 10 and 11, through which a connection is established to external resistance sections 12, 13 and 14.

Each of the resistance sections is provided with a plurality of intermediate taps which are respectively connected to a series of stationary contact members 15. These contact members are arranged in three groups and are disposed substantially in the arc of a circle.

A rotatable contact member 15$^a$ having three arms 16, 17 and 18, is adapted to sweep over the stationary contact members and to interconnect corresponding stationary contact members of the three groups.

The rotatable contact member 15$^a$ is operatively connected to a motor 19 which comprises an armature 20 and a field magnet winding 21.

A direct current generator 21$^a$ having an armature 22 and field magnet winding 23 is mechanically connected to the induction motor 1 and is electrically connected across the terminals of a constant potential direct current source 24, the armature 20 of the motor 19 being included in series circuit relation with the generator armature 22.

The generator 21$^a$ is so connected to the constant potential source, as to act in opposition to it and, consequently, energy is supplied to the motor 19 either from the aforesaid source or from the terminals of the direct generator 21$^a$, according to the predominating electromotive force.

The electromotive force at the terminals of the generator 21$^a$ depends upon the speed at which the generator is operated and the speed of the main motor and of the generator depends, of course, upon the motor load.

The generator is designed to produce an electromotive force which is substantially equal and opposite to, and therefore neutralizes, the electromotive force of the constant potential source 24 when the motor speed is normal. Consequently, under these conditions, the motor 19 will be at rest and no adjustment of the rotatable contact member 15$^a$ will be effected.

The operation of the system is a follows:

Assuming that the load on the motor is light and that the rotatable contact member 15$^a$ occupies the position shown in the drawing, if the motor load is increased, the speed will diminish somewhat and the motor 19 will be so operated, by reason of the resulting preponderance of the constant-potential source, as to rotate the contact member 15$^a$ and its arms 16, 17 and 18, in a counter-clockwise direction and thus exclude a corresponding portion of each of the resistance sections 12, 13 and 14 from the secondary winding circuit of the motor. The motor speed will accordingly increase and restore the balanced relation between the generator electromotive force and the electromotive force of the constant potential source 24.

The rotatable contact member will be at rest until there is another change in the load of the motor.

From the foregoing, it is evident that the speed of the induction motor is automatically maintained substantially constant, irrespective of load variations.

While I have shown a three-phase induction motor, my invention is not restricted to this arrangement and I desire that only such limitations shall be imposed as are indicated in the appended claims.

I claim as my invention:

1. An induction motor having a speed-governor comprising a resistor, means for including variable amounts of the resistor in the secondary circuit of the motor and a controlling means comprising two opposing electromotive force generators one of which is driven by said motor and the other of which has a substantially constant voltage value.

2. An induction motor having an adjustable secondary resistance, a generator operatively connected to the motor, an opposing source of energy connected to the terminals of the generator and normally neutralizing the generated electromotive force, and means depending upon a difference between the electromotive forces of the generator and of said source for automatically adjusting the secondary resistance of the motor.

3. An induction motor having an adjustable secondary resistance, a generator operatively connected to the motor, an opposing source of energy connected to the terminals of the generator and normally neutralizing the generated electromotive force, and electro-responsive means, depending upon a difference between the electromotive forces of the generator and of said source, for automatically adjusting the secondary resistance of the motor.

4. A polyphase induction motor having an adjustable external resistance, stationary and movable contact members for determining the active portion of the resistance, a small motor operatively connected to the movable contact member, and a pair of opposed sources of energy normally neutralizing each other and tending to act upon the motor, one of said sources being operatively dependent upon the induction motor.

5. A polyphase induction motor having an external secondary resistance, a controller for adjusting the resistance, a pilot motor operatively connected to the controller, a generator operatively connected to the induction motor, a constant-potential source of energy connected to the terminals of the generator and normally neutralizing the generated potential, said pilot motor being interposed between the constant-potential source and the generator.

6. A polyphase induction motor having an external secondary resistance, a controller for adjusting the resistance, a pilot motor operatively connected to the controller, a generator operatively connected to the induction motor, a constant-potential source of energy connected to the terminals of the generator and normally neutralizing the generated potential, said pilot motor being interposed between the constant-potential source and the generator and adapted to so adjust the controller as to keep the speed of the induction motor substantially constant under varying loads.

In testimony whereof, I have hereunto subscribed my name this 28th day of June, 1912.

HARVE R. STUART.

Witnesses:
CLYDE C. MINER,
FLORENCE I. JAYNES.